United States Patent [19]

Sirett et al.

[11] 4,264,638

[45] Apr. 28, 1981

[54] DRY BEVERAGE MIX COMPOSITION AND PROCESS

[75] Inventors: Robert R. Sirett, Cobourg; James D. Eskritt, Codrington; Edward J. Derlatka, Oshawa, all of Canada

[73] Assignee: General Foods Limited, Toronto, Canada

[21] Appl. No.: 773,983

[22] Filed: Mar. 3, 1977

[30] Foreign Application Priority Data

Mar. 10, 1976 [CA] Canada ................................. 247514

[51] Int. Cl.³ ............................................... A23C 9/00
[52] U.S. Cl. ................................. 426/580; 426/285; 426/584; 426/588; 426/590
[58] Field of Search ............... 426/590, 580, 584, 658, 426/330.2, 96, 103, 302, 285; 252/363.5

[56] References Cited

U.S. PATENT DOCUMENTS

| | | | |
|---|---|---|---|
| 3,073,703 | 1/1963 | Dunn | 426/590 |
| 3,076,709 | 2/1963 | Rivoche | 426/580 |
| 3,336,139 | 8/1967 | Mech et al. | 426/580 |
| 3,378,375 | 4/1968 | Little | 426/330.2 |
| 3,432,306 | 3/1966 | Edwards | 426/580 |
| 3,692,532 | 9/1972 | Shenkenberg et al. | 426/584 |
| 3,850,838 | 11/1974 | Guckenberger | 426/96 |

*Primary Examiner*—Joseph M. Golian
*Assistant Examiner*—Elizabeth A. Hatcher
*Attorney, Agent, or Firm*—Mitchell D. Bittman

[57] ABSTRACT

A dry beverage mix composition for use in preparing a low pH milk-based beverage comprising a readily soluble substrate with carboxymethylcellulose applied to it, and an edible acid in an amount effective to bring the pH of the beverage to below about 5.

17 Claims, No Drawings

DRY BEVERAGE MIX COMPOSITION AND PROCESS

This invention relates to a novel dry beverage mix composition for use in preparing a low pH milk-based beverage. By controlling coagulation this acidified milk-based beverage is stable at pH's below the isoelectric point (about pH 5) of the milk protein.

A major problem with making an acidified milk-based beverage is the fact that the quantities of acid which are required to impart a desirable tartness may result in the excessive precipitation of the milk protein. It appears that due to the excessive curdling of milk when its pH is lowered below the isoelectric point of milk protein, the prior art restricts the use of an acidulent in a milk-based beverage, particularly when a dry mix is to be employed.

While acidic milk systems have been proposed they generally either were directed to a pudding or yoghurt rather than a beverage system or required special process conditions or ingredients to prevent coagulation. For example, Canadian Patent Application No. 198,775 by J. Eskritt et al. describes a yoghurt dessert which utilizes pregelatinized starch and a hydrocolloid gum. U.S. Pat. No. 3,692,532 by D. Shenkenberg et al. describes a milk-fruit juice beverage. However, the milk must first be mixed with sugar and carboxymethylcellulose and allowed to stand for at least 10 minutes prior to addition of any fruit juice. Furthermore, it appears these prior art systems are not suitable for preparing a dry beverage mix composition which can be reconstituted with milk or water (where milk solids are in the dry mix).

Thus, the present invention is directed to a dry beverage mix composition which can be reconstituted quickly and simply to prepare a stable acidified milk-based beverage which will not deteriorate upon standing for relatively long periods of time after preparation.

The present invention thus is directed to a dry beverage mix composition for use in a milk-based beverage comprising a readily soluble substrate with carboxymethylcellulose applied to it, so that upon dispersing in aqueous solution (i.e., milk or water) said carboxymethylcellulose will be readily solubilized, and an edible acid present in an amount effective to bring the pH of the milk-based beverage to below about 5. The preferred substrate is either sugar or milk solids.

By quickly solubilizing the carboxymethylcellulose (CMC), i.e., enabling the gum to form a colloidal dispersion quicker than when not applied to the readily soluble substrate, coagulation and curdling of the milk are controlled even though the acidity of the beverage is below the isoelectric point of the milk proteins.

The carboxymethylcellulose is rendered readily solubilized or dispersible (i.e., increased capability of forming a dispersion quicker) by applying it to a readily soluble substrate. Upon introduction of the substrate with CMC into milk or water since the substrate readily solubilizes this will aid the applied carboxymethylcellulose to also readily and quickly form a colloidal dispersion thereby enabling the carboxymethylcellulose to control the coagulation of the milk. The carboxymethylcellulose may be applied to the substrate a number of ways depending upon the type of substrate. For example, the carboxymethylcellulose and the substrate and if desired the other ingredients of the dry mix (e.g., acid, sweetener, etc.) may be mixed together in solution and then spray dried or freeze dried and ground. The substrate and carboxymethylcellulose may alternatively be mixed with an amount of water suitable to effect adhesion between the carboxymethylcellulose particles (preferably fine particles) and the substrate particles. Care should be taken, however, when applying the gum to the substrate to avoid lumping or caking which could adversely effect the rate of solubility of the dry mix composition and therefore inhibit the carboxymethylcellulose from preventing the coagulation of the milk.

The readily soluble substrate is present in an amount effective to disperse the carboxymethylcellulose in the beverage prepared from the dry composition. The substrate may be any one of a number of substances which is readily and quickly soluble in aqueous solution such as sugar (e.g., sucrose, dextrose, lactose), milk solids, etc., and which is compatible with the beverage desired (e.g., flavoring, consistency, texture, etc.). When utilizing sucrose as a substrate to disperse the carboxymethylcellulose (CMC) generally a minimum level of 7 parts sucrose to 1 part CMC is desirable to effectively disperse the CMC and to enable the CMC to quickly and readily form a colloidal dispersion.

The carboxymethylcellulose is present in an amount effective to stabilize the milk-based beverage at a pH level below the isoelectric point of the milk protein, i.e., below about 5. The preferred minimum effective level of use of carboxymethylcellulose is about 0.15% by weight of the reconstituted milk-based beverage when the mix is reconstituted with whole milk. The maximum level of use is limited by the desired taste, consistency and texture of the beverage. While the particle size of the carboxymethylcellulose is not critical it is preferred the particle size be as small as practical, preferably less than about a 270 U.S. Standard mesh screen size, since the carboxymethylcellulose will have a greater tendency to disperse in milk or water. The viscosity of the carboxymethylcellulose is generally to be determined by the consistency of the beverage desired, however, the lower viscosity carboxymethylcellulose is preferred since the gum is generally more dispersible (able to form a colloidal dispersion) the less viscous it is.

Among the edible acids which may be employed are citric, malic, fumaric, lactic, and adipic acids. The edible acid is present in an amount effective to adjust the pH of the milk-based beverage to below the isoelectric point of milk protein, i.e., below about 5. While a stable beverage may be prepared at pH levels lower than 3, due to taste considerations, a pH of about 3 is the preferred lower level.

While milk or milk solids are not necessarily an ingredient of the dry beverage mix composition, the dry mix when reconstituted must necessarily result in a milk-based beverage, i.e., milk being a major ingredient (greater than about 50%) and generally within the range of 50 to 90% by weight of the reconstituted beverage. This may mean that the dry beverage mix composition is reconstituted with milk or that the dry mix contains sufficient milk solids so that if the dry mix is reconstituted with water, milk (in liquid form) will still be the major ingredient. The milk may also be any suitable type such as skim, whole, non-fat milk solids, reconstituted, etc., depending upon the type of beverage desired.

The dry beverage mix composition will also preferably contain a sweetening agent, natural or artificial, with sucrose being the preferred sweetening agent in addition to the sugar which may be the readily soluble substrate. Examples of other sweetening agents which may be used are dextrose, lactose, corn syrup solids, edible saccharin salts, dipeptide salts and the like. The level of sweetening agents to be used is to be governed by taste considerations, with a level of sucrose of about 8 to 10% by weight of the reconstituted beverage being a preferred level.

The dry beverage mix composition may also contain additional desirable ingredients such as flavors, colors, emulsifiers, bulking agents, etc., which may be employed in the manner and at levels known to one skilled in the art. These additional ingredients may be used in the dry mix to simulate the taste and appearance of natural fruit or vegetables in the prepared beverage.

Preferably, the dry beverage mix composition is in powder form so as to facilitate the solubilization of the substrate and carboxymethylcellulose in the milk, water or mixtures used to reconstitute the dry mix.

Generally, approximately 15 to 30 grams of the dry beverage mix composition is reconstituted with 170 ml (6 ounces) of milk. When the milk solids are in the dry mix generally about 35 to 50 grams of the mix is reconstituted with 170 ml (6 ounces) of milk or water. After reconstitution a milk-based tart beverage is immediately available for consumption. One unique factor of the present invention is that there is no holding step necessary between the addition of the gum and milk and the addition of the acid. The dry beverage mix composition is especially adapted for easy reconstitution by the consumer since the consumer does not have to follow any complicated procedure for preparing the beverage but simply adds the correct amount of mix to milk or water, and stirs.

EXAMPLE I

|  | % | Weight (grams) |
|---|---|---|
| Sugar | 87.1 | 18.6 |
| Citric Acid | 7.0 | 1.5 |
| CMC | 5.3 | 1.13 |
| Water | 0.2 | 0.0426 |
| Color | 0.05 | 0.0113 |
| Flavor | 0.35 | 0.0750 |

Utilizing a ribbon blender the sugar and the color were dry mixed for 2 minutes then the water at room temperature was mixed in for about 5 minutes. The CMC was then added and mixed in for 2 minutes. The acid and flavor were then mixed in for about 5 minutes.

The product was spoon reconstituted in milk, i.e., approximately 21 grams of the product was mixed thoroughly in a glass with 170 ml of whole milk. A tangy beverage was obtained which had a desirable texture and flavor. Coagulation or curdling of the milk was not apparent upon standing and storage of the beverage.

EXAMPLE II

|  | Dry % | Dry-Weight (grams) |
|---|---|---|
| Whole Milk Solids | 50.01 | 28.6 |
| Sucrose | 43.72 | 25.0 |
| Citric Acid | 3.50 | 2.0 |
| CMC | 2.62 | 1.5 |
| Flavor | 0.13 | 0.075 |
| Color | 0.02 | 0.0125 |

The CMC (1.5 parts) is dispersed into 220 parts of chilled whole milk (13% solids) at about 5° C. and then the mixture is spray dried at an inlet temperature of about 150° C. and an outlet temperature of about 70°–80° C., and then dry-blended with the remaining ingredients. The dry product was reconstituted with water in a 1 part product to 4 parts liquid ratio. A tangy beverage with a desirable flavor and texture was obtained. Coagulation or curdling of the milk was not apparent upon standing or storage of the beverage.

EXAMPLE III

|  | Dry % | Dry-Weight (grams) |
|---|---|---|
| Whole Milk Solids | 48.73 | 28.6 |
| Sucrose | 42.60 | 25.0 |
| Citric Acid | 3.41 | 2.0 |
| CMC | 2.56 | 1.5 |
| Mono and diglyceride | 2.56 | 1.5 |
| Flavor | 0.12 | 0.075 |
| Color | 0.02 | 0.0125 |

The CMC (1.5 parts) and the mono and diglyceride (1.5 parts, to control foaming) were dispersed in a high shear mixer with 220 parts of whole milk (13% solids) at room temperature (about 25° C.) for approximately 2 minutes (for a time sufficient to disperse the CMC). The remaining ingredients were mixed in a further 2 minutes. The mixture was then freeze dried and ground. The dry product was reconstituted with milk in a 1 part product to 4 part liquid ratio. A tangy beverage was obtained with a desirable flavor and texture. Coagulation or curdling was not apparent upon standing or storage of the beverage.

The embodiments of the invention in which an exclusive property or privilege is claimed are defined as follows:

1. A dry beverage mix composition for use in a milk-based beverage wherein upon reconstituting the dry beverage mix composition with milk or water, milk in liquid form will be greater than 50% by weight of the reconstituted beverage, comprising:
   (a) a readily soluble substrate with carboxymethylcellulose applied to it by mixing the carboxymethylcellulose and the substrate with an amount of water suitable to effect adhesion between the carboxymethylcellulose particles and the substrate particles, the readily soluble substrate being present in an effective amount so that upon dispersing in aqueous solution said carboxymethylcellulose will be readily solubilized, the carboxymethylcellulose being present in an amount effective to stabilize and control coagulation and curdling of the milk-based beverage when reconstituted and at a pH below about 5, and
   (b) an edible acid in an amount effective to bring the pH of the milk-based beverage when reconstituted to below about 5.

2. The composition of claim 1 wherein said substrate is a sugar.

3. The composition of claim 2 wherein said sugar is mixed with the water and then said carboxymethylcellulose is mixed in.

4. The composition of claim 3 further comprising milk solids.

5. The composition of claim 1 wherein said substrate is milk solids.

6. The composition of claim 1 wherein 1 part by weight of carboxymethylcellulose is applied onto at least 7 parts by weight of sugar.

7. The composition of claim 1 wherein said acid is citric acid.

8. Process for preparing a milk-based beverage comprising reconstituting the dry beverage mix composition of claim 2 with milk.

9. Process for preparing a milk-based beverage comprising reconstituting the dry beverage mix composition of claim 4 with water or milk.

10. The composition of claim 1 wherein the effective amount of carboxymethylcellulose is at least about 0.15% by weight of the reconstituted milk-based beverage.

11. A dry beverage mix composition for use in a milk-based beverage wherein upon reconstituting the dry beverage mix composition with milk or water, milk in liquid form will be greater than 50% by weight of the reconstituted beverage comprising:

(a) a readily soluble substrate with carboxymehtylcellulose applied to it by mixing the carboxymethylcellulose and substrate together in solution followed by drying the solution, the readily soluble substrate being present in an effective amount so that upon dispersing in aqueous solution said carboxymethylcellulose will be readily solubilized, the carboxymethylcellulose being present in an amount effective to stabilize and control coagulation and curdling of the milk-based beverage when reconstituted and at a pH below about 5, and (b) an edible acid in an amount effective to bring the pH of the milk-based beverage when reconstituted to below about 5.

12. The composition of claim 11 wherein said substrate is milk solids.

13. The composition of claim 12 further comprising a sweetening agent.

14. The composition of claim 11 wherein said acid is citric acid.

15. The composition of claim 11 wherein the effective amount of carboxymethylcellulose is at least about 0.15% by weight of the reconstituted milk-based beverage.

16. Process for preparing a milk-based beverage comprising reconstituting the dry beverage mix composition of claim 11 with milk.

17. Process for preparing a milk-based beverage comprising reconstituting the dry beverage mix composition of claim 12 with water.

* * * * *